United States Patent
Oettinger (10) Patent No.: US 9,939,539 B2
(45) Date of Patent: Apr. 10, 2018

(54) WIRELESS POWER RECEIVER AND/OR FOREIGN OBJECT DETECTION BY A WIRELESS POWER TRANSMITTER

(71) Applicant: TEXAS INSTRUMENTS INCORPORATED, Dallas, TX (US)

(72) Inventor: Eric Gregory Oettinger, Rochester, MN (US)

(73) Assignee: Texas Instruments Incorporated, Dallas, TX (US)

(*) Notice: Subject to any disclaimer, the term of this patent is extended or adjusted under 35 U.S.C. 154(b) by 322 days.

(21) Appl. No.: 14/667,880

(22) Filed: Mar. 25, 2015

(65) Prior Publication Data

US 2015/0285926 A1    Oct. 8, 2015

Related U.S. Application Data

(60) Provisional application No. 61/975,501, filed on Apr. 4, 2014.

(51) Int. Cl.

| | |
|---|---|
| *G01V 1/00* | (2006.01) |
| *H02J 50/70* | (2016.01) |
| *H02J 50/60* | (2016.01) |
| *H02J 50/12* | (2016.01) |
| *H02J 5/00* | (2016.01) |

(Continued)

(52) U.S. Cl.
CPC ............ *G01V 1/00* (2013.01); *H02J 5/005* (2013.01); *H02J 7/025* (2013.01); *H02J 50/12* (2016.02); *H02J 50/60* (2016.02); *H02J 50/70* (2016.02); *H02J 7/0042* (2013.01)

(58) Field of Classification Search
CPC ...................................................... H02J 5/005
See application file for complete search history.

(56) References Cited

U.S. PATENT DOCUMENTS

| 5,831,348 A | 11/1998 | Nishizawa |
| 6,140,801 A | 10/2000 | Aoki et al. |

(Continued)

FOREIGN PATENT DOCUMENTS

| JP | 200032684 A | 1/2000 |
| KR | 1020070104777 A | 10/2007 |

(Continued)

OTHER PUBLICATIONS

PCT Search Report for cited in corresponding PCT Publication No. PCT/US15/24559, dated Jun. 18, 2015 (1 page).

(Continued)

*Primary Examiner* — Hai L Nguyen
(74) *Attorney, Agent, or Firm* — William B. Kempler; Charles A. Brill; Frank D. Cimino (57) ABSTRACT

A wireless power transmitter includes an analog-to-digital converter (ADC) and a controller. The ADC is configured to convert an analog signal associated with a power train to digital values. The controller is configured to cause pulses to be applied to the power train to thereby cause the power train to ring, receive digital values from the ADC acquired while the power train is ringing and after the pulses complete, and, based on an analysis of the digital values of the ringing of the power train, to determine whether a wireless power receiver is present on or near the wireless power transmitter or whether a foreign object is present on the transmitter.

22 Claims, 7 Drawing Sheets

(51) Int. Cl.
  *H02J 7/02* (2016.01)
  *H02J 7/00* (2006.01)

(56) References Cited

U.S. PATENT DOCUMENTS

| | | |
|---|---|---|
| 6,683,438 B2 | 1/2004 | Park et al. |
| 7,239,103 B2 | 7/2007 | Ho |
| 8,102,147 B2 | 1/2012 | Jung |
| 9,559,547 B2* | 1/2017 | Muurinen ............... H02J 7/025 |
| 9,595,834 B2* | 3/2017 | Yamamoto ............... G01V 3/10 |
| 2007/0216392 A1 | 9/2007 | Stevens et al. |
| 2008/0197804 A1 | 8/2008 | Onishi et al. |
| 2009/0140691 A1 | 6/2009 | Jung |
| 2010/0123430 A1 | 5/2010 | Kojima et al. |
| 2011/0057606 A1 | 3/2011 | Saunamaki |
| 2011/0270462 A1 | 11/2011 | Amano et al. |
| 2012/0077537 A1 | 3/2012 | Muratov et al. |
| 2012/0146576 A1 | 6/2012 | Partovi |
| 2013/0094598 A1 | 4/2013 | Bastami |
| 2013/0169224 A1 | 7/2013 | Terao et al. |
| 2013/0300204 A1 | 11/2013 | Partovi |
| 2014/0084857 A1 | 3/2014 | Liu et al. |

FOREIGN PATENT DOCUMENTS

| | | |
|---|---|---|
| WO | WO0212917 A2 | 2/2002 |
| WO | WO2005109598 A1 | 11/2005 |
| WO | WO2009081115 A1 | 7/2009 |
| WO | WO2010055381 A1 | 5/2010 |
| WO | WO2012037279 A1 | 3/2012 |
| WO | WO2012040530 A2 | 3/2012 |
| WO | WO2013164831 A1 | 11/2013 |

OTHER PUBLICATIONS

Office Action for Chinese Patent Application 201180038170.3, dated Jul. 10, 2015 (8 pages).
Office Action for Japanese Patent Application No. 2013-530336, dated Jun. 23, 2015 (8 pages).
Search Report for PCT/US2011/52874, dated May 3, 2012 (1 page).
Search Report for European Patent Application No. 15774155.4, date of completion Aug. 21, 2017 (1 page).

* cited by examiner

WIRELESS POWER RECEIVER AND/OR FOREIGN OBJECT DETECTION BY A WIRELESS POWER TRANSMITTER

CROSS-REFERENCE TO RELATED APPLICATIONS

The present application claims priority to U.S. Provisional Patent Application No. 61/975,501, filed Apr. 4, 2014, titled "FOREIGN OBJECT DETECTION IN A WIRELESS POWER TRANSMITTER," which is hereby incorporated herein by reference in its entirety.

BACKGROUND

Wireless power is becoming increasingly popular to transfer energy to a device, for example, to charge a battery in the device and to do so without having to plug the device in to a power source. Power is transferred through the inductive coupling of a magnetic field generated by a transmitter and delivered wirelessly to a receiver (e.g., in a battery-operated device). A pair of coils of wire (one in the transmitter and the other in the receiver) may be used to wirelessly transfer the energy from transmitter to receiver. Charging pads are available which employ this technology. In a charging pad, a battery-operated device such as a smart phone is placed on the charging pad and can be charged without making an electrical connection to the phone.

A concern with wireless power transfer systems is the heating of metallic objects which may be unintentionally exposed to the magnetic field. For example, a coin, candy wrapper or car keys inadvertently might be placed on the charging pad along with the smart phone to be charged. Such objects, because they are metal, may absorb the energy being wirelessly transmitted and intended for the phone. As a result, the metal object warms up. The worst possible place for such an object is between the phone and the charging pad. A metal object in that location may be heated to temperatures that can melt the plastic surfaces of the phone and the charging pad and pose a risk of fire.

SUMMARY

In one example, a wireless power transmitter includes an analog-to-digital converter (ADC) and a controller. The ADC is configured to convert an analog signal associated with a power train to digital values. The controller is configured to cause pulses to be applied to the power train to thereby cause the power train to ring after the pulses are completed, receive digital values from the ADC acquired while the power train is ringing, and, based on an analysis of the digital values of the ringing of the power train, to determine whether a wireless power receiver is present on or near a charging pad or whether a foreign object is present on the charging pad.

In another example, a wireless power transmitter includes an analog-to-digital converter (ADC) and a controller. The ADC is configured to convert an analog signal associated with a power train to digital values. The controller is configured to cause pulses to be applied to the power train to thereby cause the power train to ring at a resonant frequency and to receive digital values from the ADC acquired while the power train is ringing and after the pulses are completed. The digital values are indicative of the ringing. The controller further is configured to compute a value indicative of a duration of the ringing, a decay rate of the ringing and a peak amplitude at a beginning of a ringing period. The controller is configured to determine that no wireless power receiver nor foreign object is present on or near the wireless power transmitter if the value indicative of the duration of the ringing is greater than an empty wireless power transmitter duration threshold. The controller is configured to determine that a foreign object is present on or near the wireless power transmitter if the value indicative of the duration is less than the empty wireless power transmitter duration threshold, the decay rate is greater than a decay rate threshold, and the peak amplitude is greater than a peak amplitude threshold. Further, the controller is configured to determine that a wireless power receiver is present on or near the wireless power transmitter with no foreign object if the value indicative of the duration is less than the empty wireless power transmitter duration threshold, and at least one of the decay rate is less than the decay rate threshold or the peak amplitude is less than the peak amplitude threshold.

In yet another example, a method includes pinging a wireless charging power train with a plurality of pulses to thereby cause the power train to ring. The method further includes determining whether a wireless power receiver is present on or near a wireless power transmitter or whether a foreign object is present on the wireless power transmitter based on values computed from the power train ringing.

BRIEF DESCRIPTION OF THE DRAWINGS

For a detailed description of exemplary embodiments of the invention, reference will now be made to the accompanying drawings in which.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The wireless power transmitter described herein comprises a resonator capacitor (C) in series with a transmitting coil (L). This LC tank circuit can be characterized by its resonant frequency and a damping factor. The presence of either metal or ferrite in the magnetic field may alter the both the resonant frequency and the damping factor. The changes in the resonant frequency and damping of the transmitter's LC tank circuit may be used to determine whether a foreign metal object is present on a wireless power transmitter.

Figure 1:
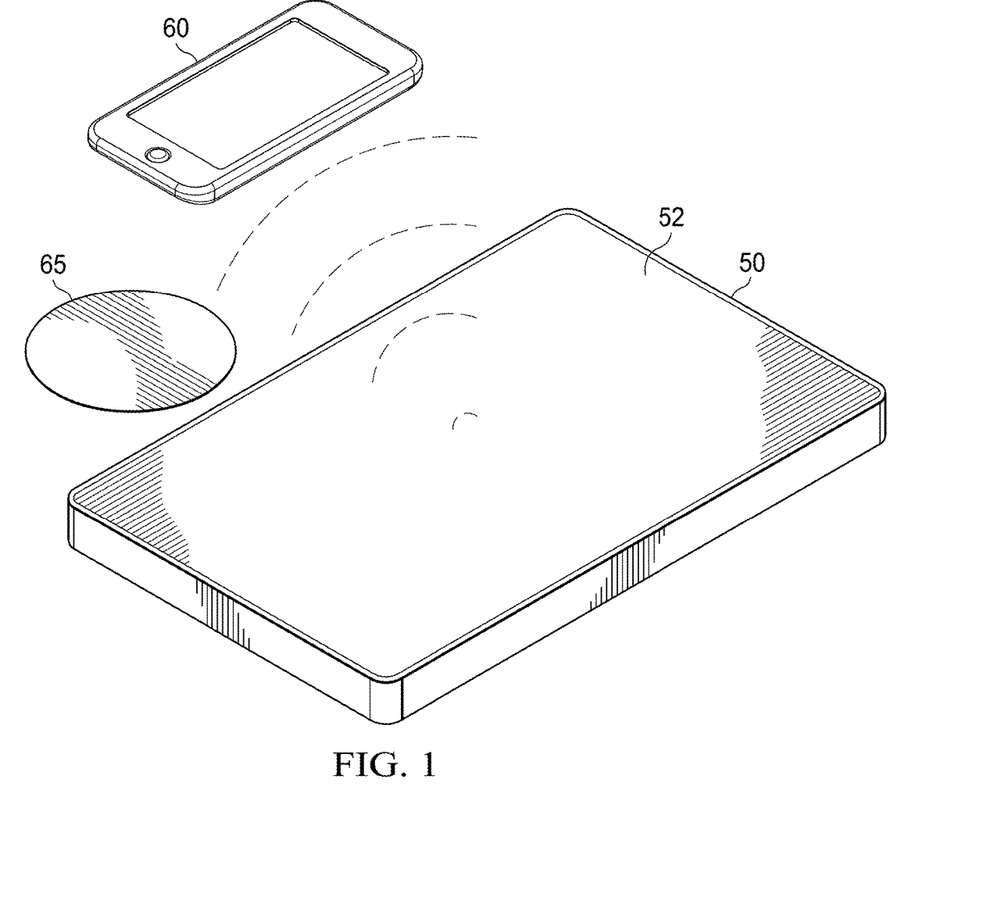
FIG. 1 shows an example of wireless power transmission system in accordance with an example.

FIG. 1 shows an example of a wireless power transmission system in accordance with various embodiments. In the example of FIG. 1, a wireless power transmitter 50 which can be used to wirelessly transmit power to a wireless power receiver 60. The wireless power receiver 60 may be a coffee cup warmer, appliance, smart phone, audio player, or other type of device to be powered or have its batteries charged by the wireless power transmitter 50. In one example, the wireless power transmitter 50 is a charging pad on which battery-operated devices can be placed to have their batteries recharged. The wireless power transmitter 50 has a surface 52 onto which the wireless power receiver 60 may be placed while charging. Reference numeral 65 identifies a foreign object that may be placed (inadvertently) on the wireless power transmitter 50 instead of or in addition to the wireless power receiver 60. Foreign objects that are of concern are objects made of metal. The term "foreign object" refers to any metal object that is not the wireless power receiver 60 intended to be charged by the wireless power transmitter 50.

As explained above, metal objects may absorb energy from the wireless power transmitter and become warm and possibly hot enough to cause harm. The embodiments described herein are directed to determining whether the wireless power transmitter 50 has nothing on in it (a safe condition), only a wireless power receiver 60 on it (also a safe condition), only a foreign object (an unsafe condition) or a wireless power receiver 60 plus a foreign object on the transmitter (also an unsafe condition). If the wireless power transmitter 50 detects the presence of a foreign object, the transmitter may react in any suitable manner such as reducing the amount of power wirelessly transferred by the transmitter, or turning off the flow of wireless power altogether. The wireless power transmitter 50 includes electronics that cause an LC tank circuit (which includes a transmitting coil) to ring at the resonant frequency of the LC tank circuit, and analyzes the natural response of the LC tank circuit to determine whether a foreign object is present on or near the wireless power transmitter.

Figure 2:
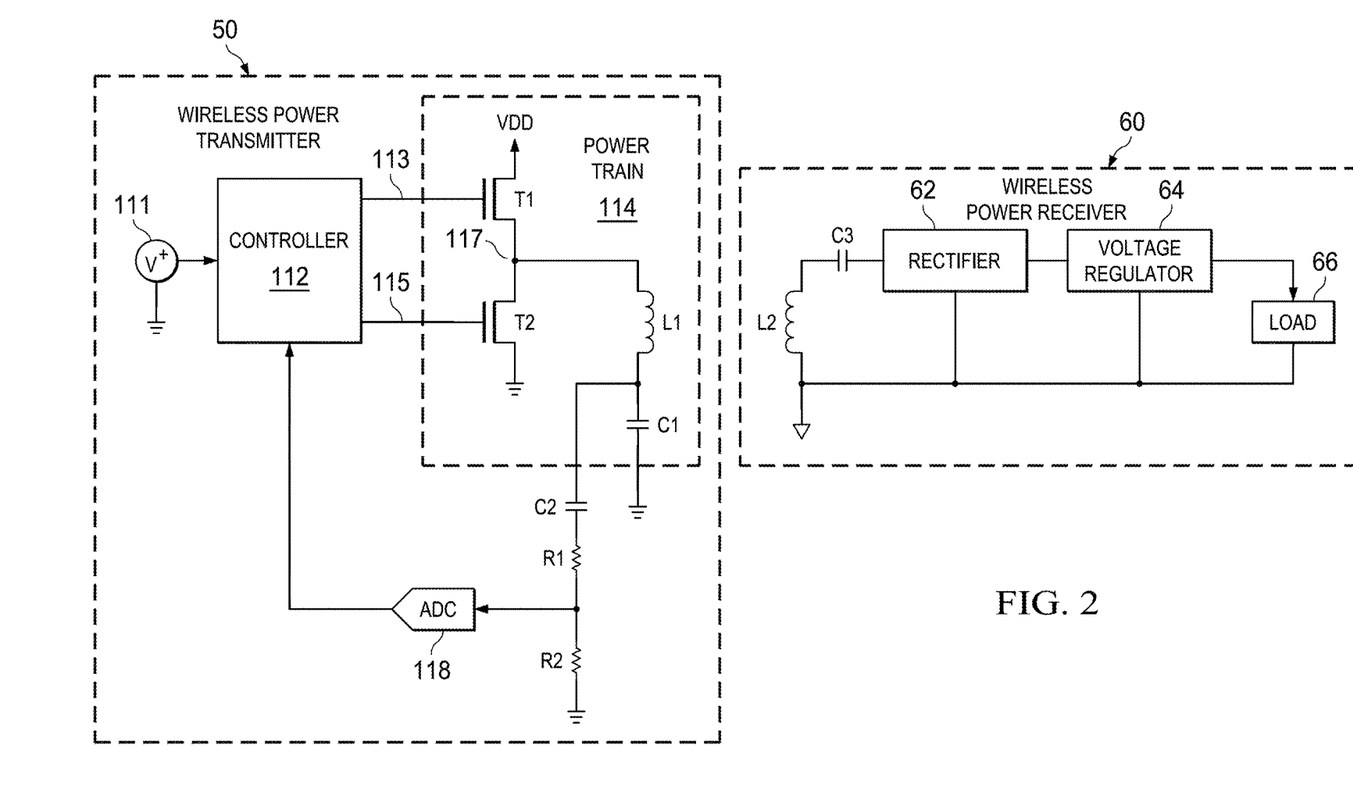
FIG. 2 shows a block diagram of the wireless power transmission of FIG. 1 in accordance with an example.

FIG. 2 shows a block diagram of an example of wireless power transmitter 50 and the wireless power receiver 60. The wireless power transmitter 50 includes a controller 112, a power train 114, and an analog-to-digital converter (ADC) 118. In some implementations, the ADC 118 may be included in the controller 112. The power train 114 may include a pair of power metal oxide semiconductor field effect transistors (MOSFETs) T1 and T2, as well as a coil L1 (inductor) and capacitor C1. The transistors T1 and T2 may be turned on and off by the controller 112 via control signals 113 and 115. The switch node 117 between the transistors is coupled to the coil L1, and through coil L1 to ground through capacitor C1. The coil L1 and capacitor C1 form a tank circuit which can be made to ring as described herein.

The controller 112 receives an input voltage 111 and asserts control signals 113, 115 to reciprocally turn the transistors T1 and T2 on an off—the transistors are not both turned on at the same time. When transistor T1 is turned on (and T2 is off), the voltage on node 117 increases to VDD. However, when transistor T2 is turned on (and T1 is off), the voltage on node 117 decreases to ground. Thus, the voltage on node 117 may be a series of positive voltage pulses controlled by the controller 112. The voltage pulses on node 117 causes an alternating current to flow through the coil L1 which in turn induces a current in coil L2 in the battery-operated device 60. The amount of wireless power transferred by the transmitter 50 can be controlled by the controller 112 by the controller varying the frequency and/or duty cycle of the voltage pulses on node 117 or adjusting the voltage level of VDD applied to the transistors.

The voltage across capacitor C1 is provided to the ADC 118 through DC blocking capacitor C2 and the voltage divider formed by resistors R1 and R2. The ADC 118 thus receives an analog signal associated with the power train and converts that analog signal to digital values to be provided to the controller 112 for further analysis. In another implementation, the analog signal provided to the ADC 118 may be associated with the current through coil L1.

Referring still to the example of FIG. 2, the wireless power receiver 60 may include the coil L2 noted above, as well as a capacitor C3, a rectifier 62, a voltage regulator 64, and a load 66. The voltage induced across the coil L2 is rectified by rectifier 62 and regulated by voltage regulator 64. A regulated voltage then is provided to a load 66, which may comprise a rechargeable battery, a charging circuit, functional circuitry of the battery-operated device, etc. Ferrite plates (not shown) may also be provided behind coils L1 and L2. Ferrite plates may be used to help control the direction of the magnetic field created by current in coil L1.

Figure 3:
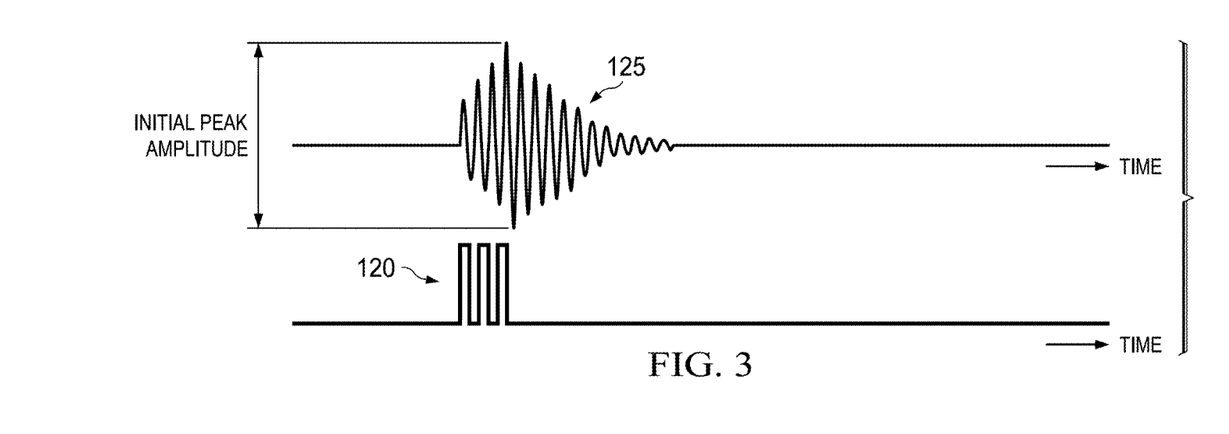
FIG. 3 illustrates that the power train of the wireless power transmitter will ring if excited by a series of pulses in accordance with an example.

FIG. 3 illustrates the response of the power train 114 of the transmitter 110 to an excitation 120. The excitation 120 includes a plurality of pulses applied to the LC tank circuit comprising coil L1 and capacitor C1. These pulses may be initiated by the controller 112. The positive voltage level of each pulse is created by the controller 112 turning on transistor T1 and turning off transistor T2, and the lower voltage level of each pulse is created by the controller 112 turning on transistor T2 and turning off transistor T1. In the example of FIG. 3, three voltage pulses are generated to excite the power train 114 but can be other than three pulses in other examples.

If the frequency of the voltage pulses (i.e., the number of pulses per unit of time) are at or near the resonant frequency of the power train 114, the power train will ring as illustrated at 125. After the excitation has ended, the ringing will dampen and eventually die out. Several parameters are characteristic of the ringing (i.e., the natural response of the system). The frequency of the ringing oscillations is the "resonant frequency" of the LC tank circuit of the power train 114. The ringing dies down at a rate that is referred to as the "rate of decay" ("decay rate"). The peak-to-peak amplitude of the ringing just after cessation of the excitation is referred to as the "initial peak amplitude." The ringing will last for a period of time before the ringing signal is lost in ambient circuit noise and this period of time is referred to as the ringing "duration."

Figure 4:
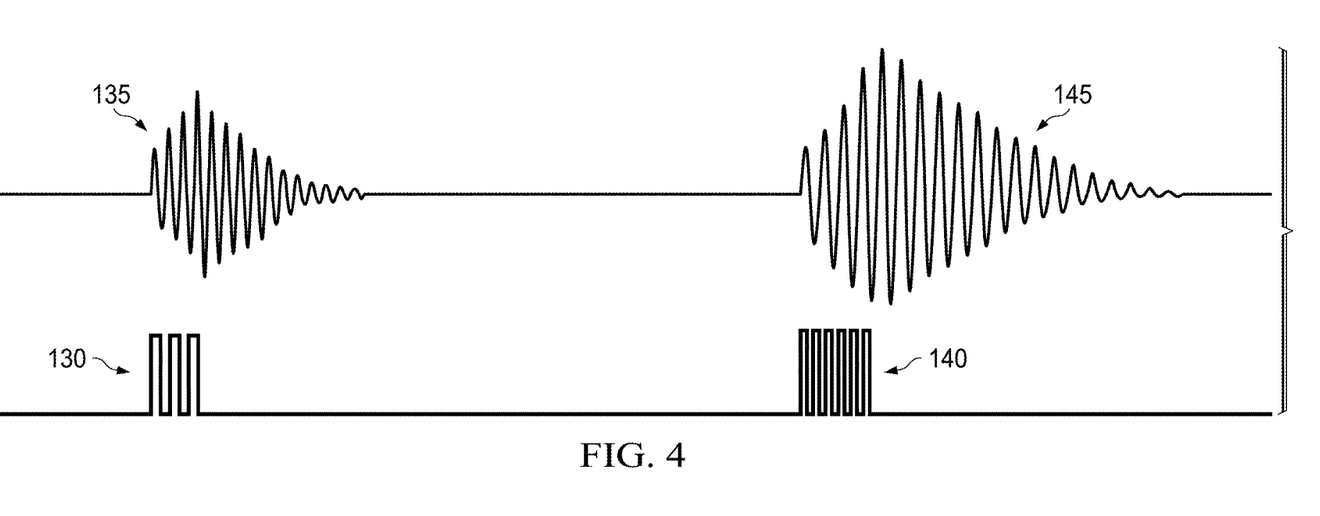
FIG. 4 illustrates that the resonant frequency of the ringing caused by pulses having a frequency near the resonant frequency can be determined and then used to again excite the power train at the determined resonant frequency in accordance with an example.
Figure 5:
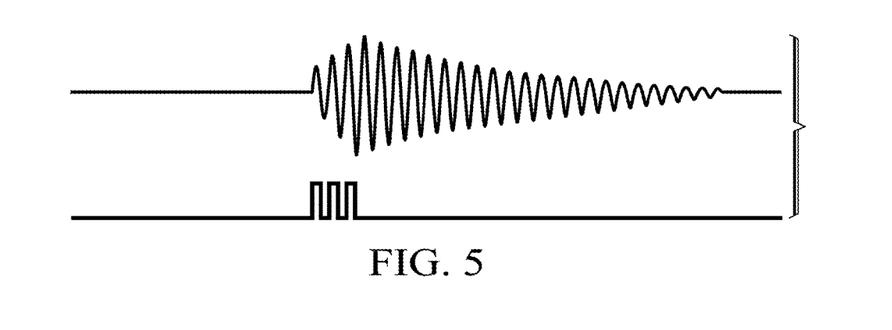
FIG. 5 illustrates the ringing of the power train with nothing on the wireless power transmitter in accordance with an example.

In accordance with various examples, the controller 112 causes an excitation 120 (multiple pulses) to be provided to the power train 114 and analyzes the resulting ringing data 125 upon completion of the excitation pulses to determine whether (a) no object is present on the wireless power transmitter 50, (b) only a wireless power receiver 60 is present on the transmitter, or (c) a foreign object 65 is present on the transmitter (with or without a receiver). To ensure there is sufficient ringing data to analyze, in some examples, the frequency of the excitation pulses are as close to the actual resonant frequency of the power train 114 as possible. However, as noted above, the resonant frequency of the power train may be altered by the presence of a foreign object 65 and/or wireless power receiver 60 in the magnetic field. Thus, in some examples the controller 112 may cause two excitations to occur as is shown in FIG. 4. The first excitation 130 comprises a series of pulses at a frequency that is likely to be close enough to the resonant frequency of the power train so as to elicit a ringing response 135. The resonant frequency may be, for example, 100 KHz with no object on the wireless power transmitter 50, higher than 100 KHz if a foreign object is on the transmitter, and lower than 100 KHz if a wireless power receiver 60 with ferrite is present on the transmitter. Thus, the frequency of the first excitation 130 may be at 100 KHz but the resonant frequency may be different than 100 KHz.

A frequency within the predicted range of possible resonant frequencies is selected for the first excitation 130. The controller 112 causes the pulses to be applied to the power train 114 to thereby cause the power train to ring as illustrated at 135. The ADC 118 digitizes the ringing analog signal and the controller 112 then receives digital values from the ADC of the ringing signal upon completion of the excitation pulses. The controller 112 determines the frequency of the ringing signal. The determined frequency is the resonant frequency of the power train as may be influenced by the present of a wireless power receiver and/or foreign object. The controller 112 then may again excite the power train 114 with another series of pulses (excitation 140) this time at the determined resonant frequency. The power train again rings (145), but because it was excited at its actual resonant frequency, the ringing is larger in amplitude and duration as shown. It is this latter data (collected based on an excitation at the resonant frequency) that is analyzed to determine whether a wireless power receiver or a foreign object is on the wireless power transmitter 50.

The number of pulses for the second excitation 140 may be the same or different than the number of pulses in the initial excitation 130. Further, the resonant frequency may be calculated by the controller 112 counting the number of oscillations of the ringing signal 135 over a period of time and dividing by the time period. Oscillations may be identified by zero-crosses after subtracting the mean from the data, and time may be measured by counting the number of clock signals of a known clock frequency in the controller between ADC samples. This will indicate the amount of time per sample (e.g., number of nsec per sample). This time reference can then be used to determine the elapsed time for a given number of oscillations.

The decay rate can also be computed by the controller 112. For example, the peak-to-peak amplitude of each oscillation may be stored in the controller 112, until the peak-to-amplitude becomes so small that the noise itself may cause zero-crossings. The controller 112 may determine the decay rate by determining the difference between the initial peak amplitude of the ringing signal and the amplitude of the smallest oscillation and dividing that difference by the number of cycles during the elapsed period of time between those two amplitudes. The resulting decay rate may be given in terms of volts per cycle.

The duration of the ringing signal also may be computed by the controller 112. The duration may be determined by determining the amount of elapsed time between the initial oscillation immediately upon the end of the last excitation pulse and the point in time at which the peak-to-peak amplitude falls so low as to be overwhelmed by noise, a threshold which may be predetermined.

Figure 6:
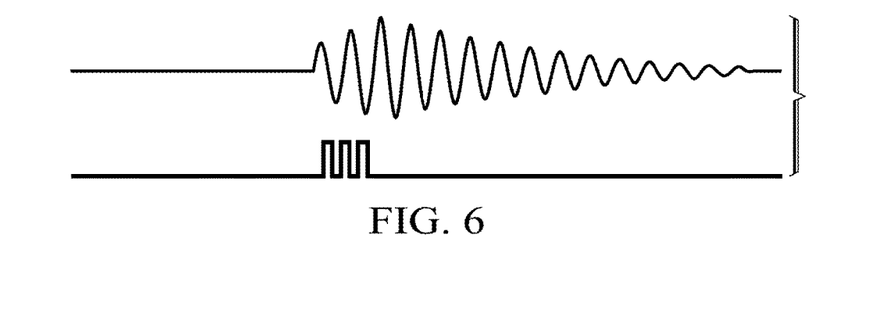
FIG. 6 illustrates the ringing of the power train with a wireless power receiver and no foreign object on the wireless power transmitter in accordance with an example.
Figure 7:
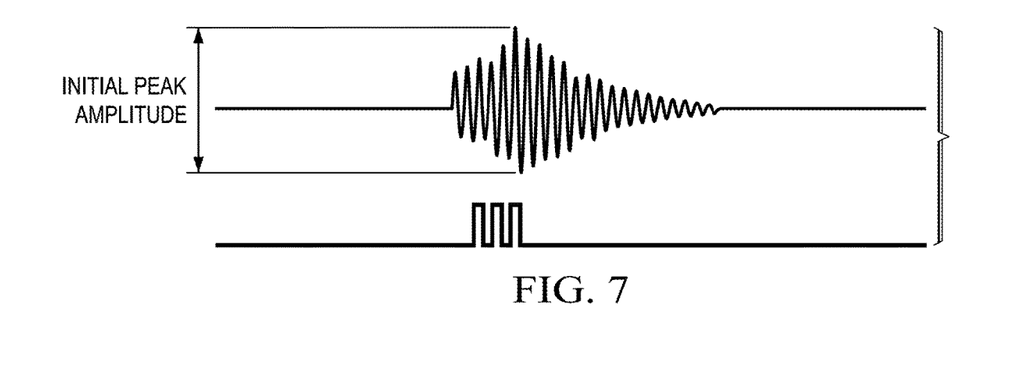
FIG. 7 illustrates the ringing of the power train with only a foreign object on the wireless power transmitter in accordance with an example.
Figure 8:
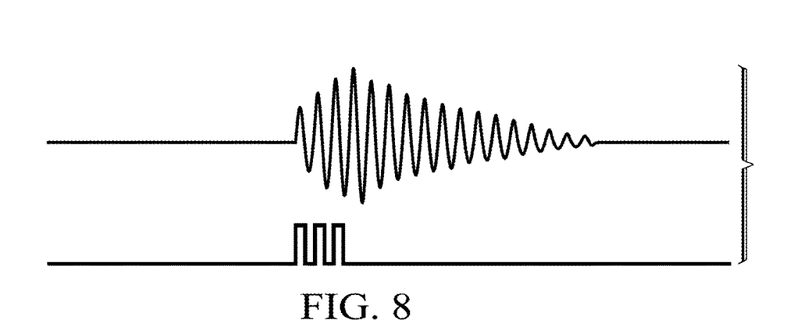
FIG. 8 illustrates the ringing of the power train with a wireless power receiver and a foreign object on the wireless power transmitter in accordance with an example.

FIGS. 5-8 depict four different scenarios in which nothing is on the wireless power transmitter 50 (FIG. 5), only a wireless power receiver 60 is on the transmitter (FIG. 6), only a foreign object 65 is on the transmitter (FIG. 7), and both a foreign object and a wireless power receiver are on the transmitter (FIG. 8).

The presence of both metal and ferrite in the magnetic field increase the amount of damping of the ringing signal. With no foreign object (metal) or wireless power receiver (ferrite) on the wireless power transmitter (FIG. 5), there is nothing there to artificially reduce the ringing of the power train. As such, the magnitude of the ringing is relatively large and lasts for a relatively long period of time (e.g., longer than in the examples of FIGS. 6-8).

With only a wireless power receiver on the transmitter (FIG. 6), the resonant frequency is lower than in other three cases and the decay rate is relatively slow. FIG. 7 illustrates the ringing response with only a foreign object on the transmitter. In this case, the resulting resonant frequency is relatively high and is characterized by a relatively rapid decay. With both a wireless power receiver 60 and a foreign object 65 on the wireless power transmitter 50 (FIG. 8), the resonant frequency is smaller than the case (FIG. 7) in which the pad has only a foreign object, but larger than with only a wireless power receiver 60 on the pad (FIG. 6).

Figure 10:
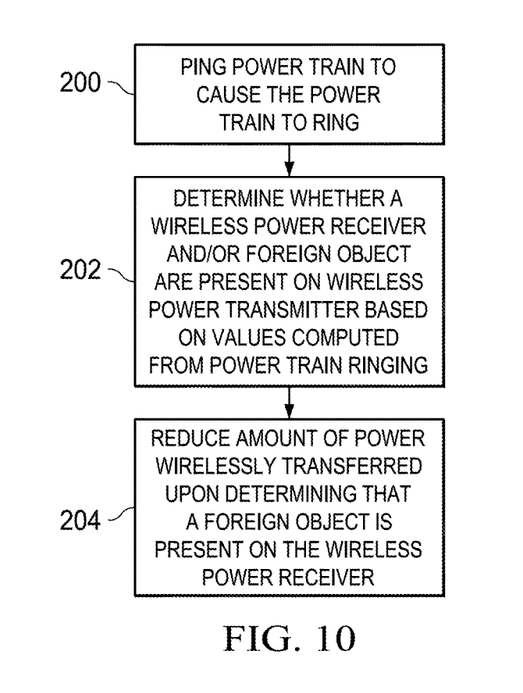
FIG. 10 shows a method of determining what, if anything, is on the wireless power transmitter in accordance with an example.
Figure 11:
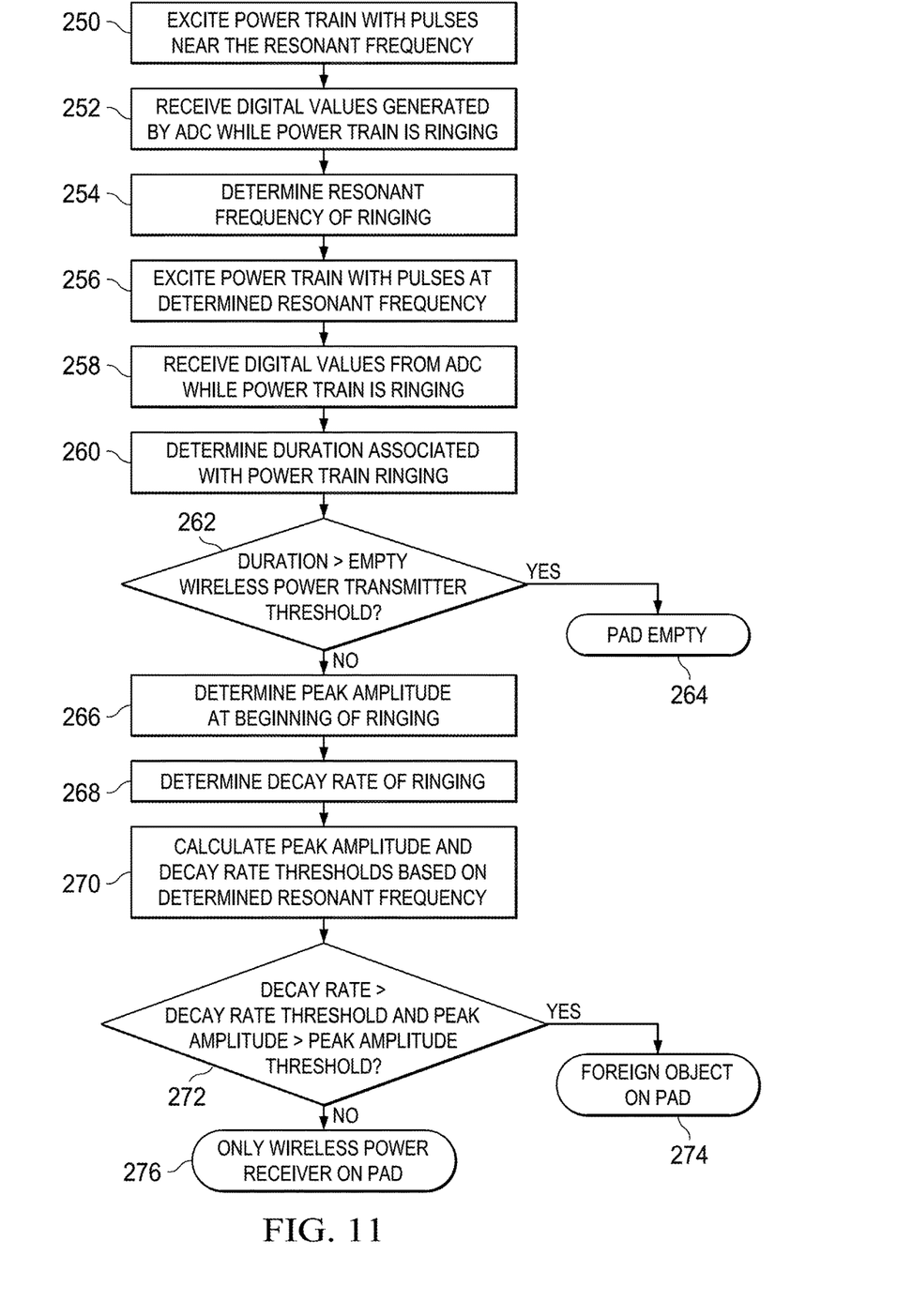
FIG. 11 shows another method of determining what, if anything, is on the wireless power transmitter in accordance with an example.
Figure 12:
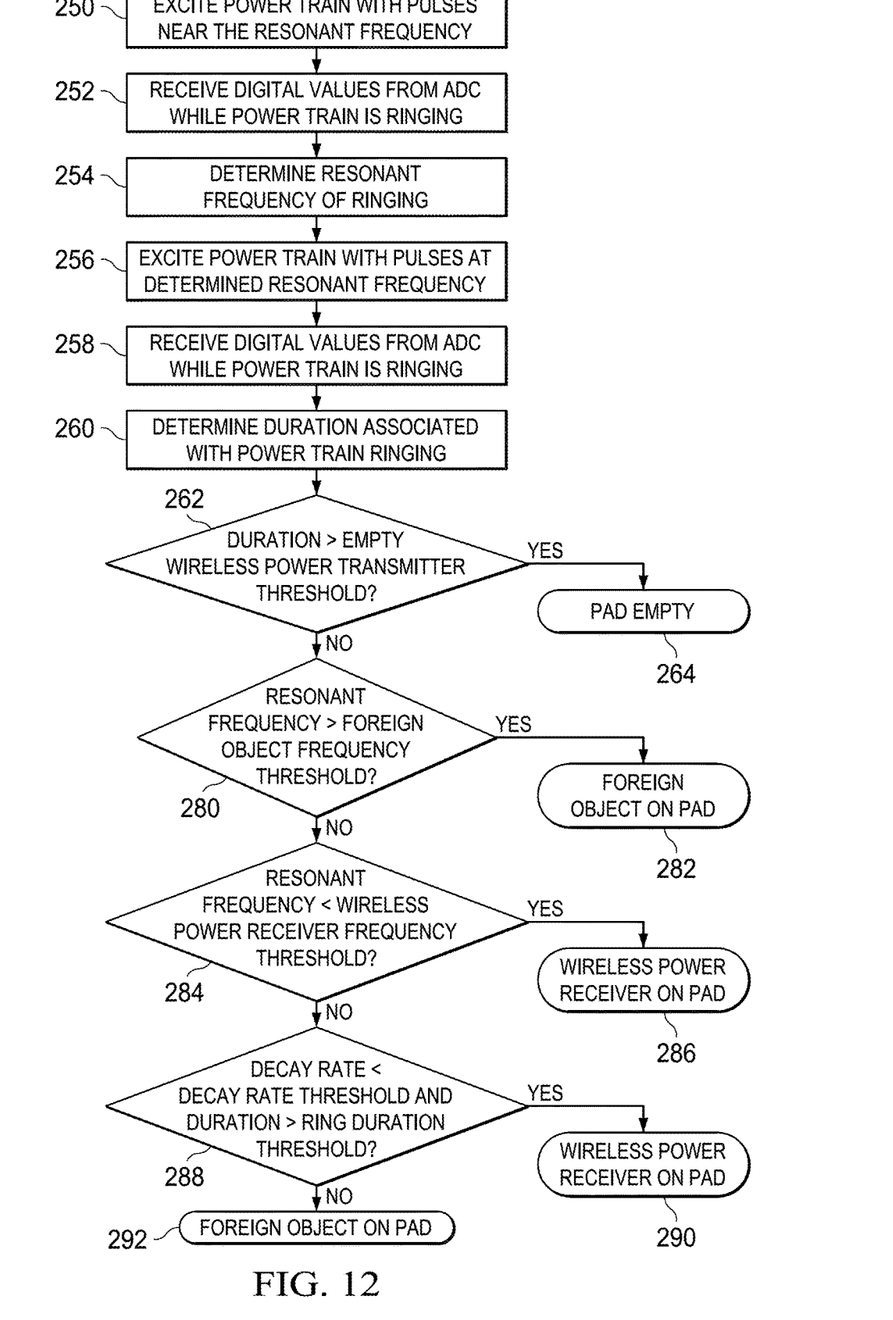
FIG. 12 shows yet another method of determining what, if anything, is on the wireless power transmitter in accordance with an example.

Referring again to FIGS. 1 and 2, in accordance with an example, a wireless power transmitter 50 includes at least an ADC 118 and a controller 112, and the ADC 118 may or may not be part of the controller 112. The ADC 118 is configured to convert an analog signal associated with the power train 114 to digital values. The controller 112 is configured to cause excitation pulses to be applied to the power train 114 to thereby cause the power train to ring. The controller 112 is further configured to receive digital values from the ADC acquired while the power train is ringing. Based on an analysis by the controller of the digital values of the ringing of the power train, the controller is configured to determine whether a wireless power receiver is present on or near the surface 52 of the transmitter 50 or whether a foreign object is present on or near the transmitter's surface 52. FIGS. 10-12 include methods that implement this functionality and will be discussed below.

The controller 112 is configured to determine that no wireless power receiver nor foreign object is present on the wireless power transmitter based on the ringing's duration exceeding an EMPTY WIRELESS POWER TRANSMITTER DURATION threshold. The EMPTY WIRELESS POWER TRANSMITTER DURATION threshold is a predetermined time threshold for which, if the power train ringing exceeds this time threshold, it can be safely assumed that the surface 52 of the transmitter 50 is empty. This time threshold may be unique to the particular characteristics of the transmitter such as the size of the coil L1, the capacitance of capacitance C1, etc. and may be chosen based on experimental testing.

Assuming that the duration does not exceed the EMPTY WIRELESS POWER TRANSMITTER DURATION threshold, then an object of some kind is present on the transmitter 50, and the controller can differentiate between a foreign object 65 being present (with or without a wireless power receiver 60) and only a wireless power receiver being present. To make these latter determinations as to the type of object present on or near the surface of the transmitter 50, the controller 112 is configured to determine an initial peak amplitude of the digital values from the ADC at the beginning of the ringing period. The initial peak amplitude (I.P.A.) is also illustrated in FIG. 7 and is the peak-to-peak amplitude of the ringing just upon expiration of the last excitation pulse. The controller further is configured to determine a decay rate of the digital values during the ringing period. The controller can determine that a foreign object is present on the transmitter based on the initial peak amplitude exceeding a PEAK AMPLITUDE threshold and the decay rate exceeding a DECAY RATE threshold.

The PEAK AMPLITUDE threshold and the DECAY RATE threshold both may be determined based on the resonant frequency of the power train 114. For example, the PEAK AMPLITUDE threshold may be computed by the controller 112 as:

$$\text{PEAK AMPL THRESH} = \text{PEAK}_{OFFSET} + \text{PEAK}_{GAIN} * (\text{RES FREQ} - \text{FP}_{FREQ})$$

where PEAK AMPL THRESH is the PEAK AMPLITUDE threshold, $\text{PEAK}_{OFFSET}$ and $\text{PEAK}_{GAIN}$ are experimentally determined based on the transmitter characteristics to reflect the expected change in the PEAK AMPLITUDE for a given shift in frequency, RES FREQ is the resonant frequency of the power train when nothing is present on the transmitter (this value is determined in advance and used as a constant in the evaluation of the response), and $\text{FP}_{FREQ}$ is measured system resonant frequency as determined by the controller after the ping as described above. The DECAY RATE threshold may be computed as:

$$\text{DECAY RATE THRESH} = \text{DECAY}_{OFFSET} + \text{DECAY}_{GAIN} * (\text{RES FREQ} - \text{FP}_{FREQ})$$

where DECAY RATE THRESH is the DECAY RATE threshold, $\text{DECAY}_{OFFSET}$ and $\text{DECAY}_{GAIN}$ are likewise determined experimentally to reflect the expected change in DECAY RATE for a given shift in frequency. If the initial peak amplitude exceeds the PEAK AMPLITUDE threshold and the decay rate exceeds the DECAY RATE threshold, then the controller determines that a foreign object is present on or near the transmitter 50 (either with or without a wireless power receiver 60 also being present). If the controller 112 determines that either the initial peak amplitude does not exceed the PEAK AMPLITUDE threshold or the decay rate does not exceed the DECAY RATE threshold, then the controller determines that a wireless power receiver 60, with no foreign object, is present on or near the wireless power transmitter.

Figure 9:
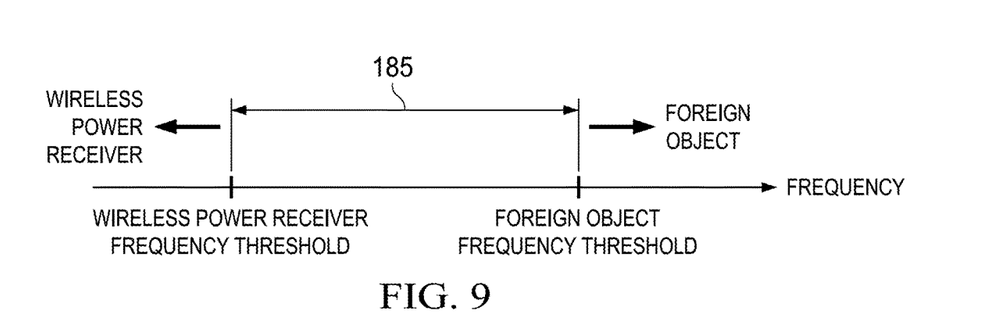
FIG. 9 illustrates a frequency spectrum with frequency thresholds useful to differentiate a foreign object from a wireless power receiver.

In another example, the controller 112 determines whether the wireless power transmitter is empty based, as explained above, on whether the ringing duration exceeds the EMPTY WIRELESS POWER TRANSMITTER DURATION threshold. If such is not the case, then the controller in this example determines whether a foreign object or a wireless power receiver only is present on or near the transmitter based on a comparison of the resonant frequency to corresponding thresholds. FIG. 9 illustrates a frequency spectrum with two thresholds—a WIRELESS POWER RECEIVER FREQUENCY threshold and a FOREIGN OBJECT FREQUENCY threshold (both predetermined experimentally or otherwise). If the resonant frequency of the power train is greater than the FOREIGN OBJECT FREQUENCY threshold, then the controller 112 determines that a foreign object is present on or near the charging pad. If, however, the resonant frequency of the power train is less than the WIRELESS POWR RECEIVER FREQUENCY threshold, then the controller 112 determines that a wireless power receiver 60 (with no foreign object) is present on or near the transmitter's surface 52.

Thus, the controller is configured to determine the resonant frequency of the power train ringing and to determine that a foreign object is present on the transmitter's surface based on the resonant frequency exceeding the FOREIGN OBJECT FREQUENCY threshold and based on the ringing's duration not exceeding the EMPTY WIRELESS POWER TRANSMITTER DURATION threshold. Further, the controller is configured to determine that a wireless power receiver (with no foreign object) is present on the transmitter's surface 52 based on the resonant frequency being below the WIRELESS POWER RECEIVER FREQUENCY threshold and based on the ringing's duration not exceeding the EMPTY WIRELESS POWER TRANSMITTER DURATION threshold.

If, however, the resonant frequency is in the middle region 185 between the WIRELESS POWER RECEIVER FREQUENCY threshold and the FOREIGN OBJECT FREQUENCY threshold, then the controller 112 determines that a wireless power receiver 60 (with no foreign object) is present on or near the transmitter based on a determination that decay rate is exceeds a DECAY RATE threshold and the power train's ringing duration exceeds a RING DURATION threshold. The DECAY RATE threshold used in this example may be the same or different than the DECAY RATE threshold discussed above. The RING DURATION threshold may be less than the EMPTY WIRELESS POWER TRANSMITTER DURATION threshold and may be determined experimentally. For the case in which the resonant frequency falls in middle region 185, but either the decay rate does not exceed the DECAY RATE threshold or the ringing's duration does not exceed the RING DURATION threshold, then the controller 112 determines that a foreign object is present on or near the transmitter's surface 52.

FIG. 10 illustrates a method for determining whether an object is present on the transmitter 50 and, if so, whether that object is a foreign object. The method may include any one or more of the operations depicted in various combinations, and in a different order than that shown in FIG. 10. The controller may perform, or caused to be performed some or all of the operations listed.

The method includes at 200 pinging a power train with a plurality of electrical pulses to thereby cause the power train to ring. As explained above, the controller 112 may ping the power train 114 by controlling the transistors T1 and T2 to turn on an off at a desired frequency (e.g., the resonant frequency). The method further includes at 202 determining whether a wireless power receiver is present on a wireless power transmitter or whether a foreign object is present on the transmitter based on values computed from the power train ringing. The method also includes at 204 reducing the amount of power wireless transferred by the transmitter 110 upon determining that a foreign object is present on the transmitter. The power transfer may be terminated completely if desired.

FIG. 11 illustrates a method for determining whether an object is present on the wireless power transmitter 50 and, if so, whether that object is a foreign object in accordance with another example. The method may include any one or more of the operations depicted in various combinations, and in a different order than that shown in FIG. 10. The controller may perform, or caused to be performed some or all of the operations listed.

At 250, the method includes exciting the power train 114 with pulses near the resonant frequency. As explained above, the resonant frequency of the power train varies to some degree depending on whether the transmitter surface 52 is devoid of any object (receiver or foreign object) or whether a foreign object is present, and whether a wireless power receiver is present. It is desirable for the power train to be excited at its resonant frequency but, not knowing whether an object is present or, if present, the type of object, the transmitter's controller 112 does not initially know the resonant frequency. Thus, the frequency of the pulses for the excitation of operation 250 is a predetermined frequency (e.g., half-way between the lowest and highest anticipated resonance frequencies, or at the resonant frequency of the power train when no object is present).

The ADC 118 samples the analog ringing signal caused to occur by the excitation of 250 and the digital values generated by the ADC are provided to the controller 112 (operation 252). At 254, the controller 112 then determines the resonant frequency of the ringing based on the digital values generated by the ADC. The method further includes again exciting the power train at 254, but this time the frequency of the excitation pulses are at the resonant frequency determined at 254.

At 258, the digital values from the ADC are received by the controller 112. These values are generated by the ADC while the power train was ringing at its resonant frequency. At 260, the controller determines the duration associated with the power train ringing. For example, the duration may be the time duration from the end point of the last excitation pulse to the time at which the ringing amplitude drops below a predetermined threshold (e.g., a threshold approaching the level at which noise may become larger than the signal itself).

The controller then compares (262) the duration to the EMPTY WIRELESS POWER TRANSMITTER DURATION threshold. If the duration is greater than the EMPTY WIRELESS POWER TRANSMITTER DURATION threshold, the controller determines at 264, that the pad is empty (i.e., no battery-operated device nor foreign object is present on or near the transmitter 50).

If the duration is less than the EMPTY WIRELESS POWER TRANSMITTER DURATION threshold, then either one or more of a wireless power receiver 60 and a foreign object 65 are present on or near the wireless power transmitter, but without more information, the controller does not know which is present. At 266, the method includes the controller determining the initial peak amplitude at the beginning of the ringing period as explained above. At 268, the controller determines the decay rate of the ringing and, at 270, calculates the PEAK AMPLITUDE and DECAY RATE thresholds based on the determined resonant frequency. Examples of formulas for these thresholds are provided above.

The decay rate and the initial peak amplitude are compared to their corresponding thresholds at 272. If the decay rate is greater than the DECAY RATE threshold and the initial peak amplitude is greater than the PEAK AMPLITUDE threshold, then the controller determines at 274 that a foreign object is present on or near the transmitter. Otherwise, the controller determines at 276 that a wireless power receiver with no foreign object is present on or near the transmitter.

FIG. 12 is the same as FIG. 11 from operations 250 through 264 and a description of those operations thus are not repeated. At 264, the controller has determined that the transmitter has neither a wireless power receiver nor a foreign object on it based on the length of time of the ringing of the power train. At 280, the controller compares the resonant frequency to the FOREIGN OBJECT FREQUENCY threshold. If the resonant frequency of the power train is greater than the FOREIGN OBJECT FREQUENCY threshold, then at 282, the controller determines that a foreign object is present on or near the transmitter.

At 284, the controller compares the resonant frequency to the WIRELESS POWER RECEIVER FREQUENCY threshold. If the resonant frequency of the power train is less than the WIRELESS POWER RECEIVERFREQUENCY threshold, then at 286, the controller determines that a battery-operated device (with no foreign object) is present on or near the transmitter.

The method reaches operation 288 when the resonant frequency is between the WIRELESS POWER RECEIVERFREQUENCY threshold and the FOREIGN OBJECT FREQUENCY threshold. For this resonant frequency region, the controller compares the decay rate to the DECAY RATE threshold and the ringing duration to the RING DURATION threshold. If the decay rate is less than the DECAY RATE threshold and the duration is greater than the RING DURATION threshold, then at 290, the controller determines that a wireless power receiver (with no foreign object) is present on or near the transmitter. Otherwise, the controller determines at 292 that a foreign object is present on or near the transmitter.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:
1. A wireless power transmitter, comprising:
  a power train comprising at least one transistor coupled to an LC tank circuit;
  an analog-to-digital converter (ADC) coupled to receive and convert an analog signal associated with the power train to digital values;
  a controller coupled to the tank circuit and being configured to:
    cause pulses generated by the controller to be applied to the at least one transistor of the power train to thereby cause the LC tank circuit of the power train to begin ringing;
    receive digital values from the ADC acquired while the power train is ringing and after the pulses are completed; and
    based on an analysis of the digital values of the ringing of the power train, to determine whether a wireless power receiver is present on or near the wireless power transmitter or whether a foreign object is present on or near the wireless power transmitter.

2. The wireless power transmitter of claim 1 wherein the controller is configured to:
   determine an initial peak amplitude of the digital values from the ADC at a beginning of a ringing period;
   determine a decay rate of the digital values during the ringing period; and
   determine that a foreign object is present on or near the wireless power transmitter based on the initial peak amplitude exceeding a peak amplitude threshold and the decay rate exceeding a decay rate threshold.

3. The wireless power transmitter of claim 2 wherein the controller is configured to determine that a wireless power receiver, with no foreign object, is present on or near the wireless power transmitter based on:
   either the initial peak amplitude not exceeding the peak amplitude threshold or the decay rate not exceeding the decay rate threshold; and
   the ringing's duration not exceeding an empty wireless power transmitter duration threshold.

4. The wireless power transmitter of claim 2 wherein the controller is configured to:
   determine the resonant frequency of the ringing; and
   calculate each of the peak amplitude and the decay rate thresholds based on the determined resonant frequency.

5. The wireless power transmitter of claim 1 wherein the controller is configured to determine that no wireless power receiver nor foreign object is present on or near the wireless power transmitter based on the ringing's duration exceeding an empty wireless power transmitter duration threshold.

6. The wireless power transmitter of claim 5 wherein the controller is configured to determine the resonant frequency of the ringing and to determine that a foreign object is present on or near the wireless power transmitter based on the resonant frequency exceeding a foreign object frequency threshold and based on the ringing's duration not exceeding the empty wireless power transmitter duration threshold.

7. The wireless power transmitter of claim 5 wherein the controller is configured to:
   determine the resonant frequency of the ringing; and
   determine that a wireless power receiver with no foreign object is present on or near the wireless power transmitter based on the resonant frequency being below a wireless power receiver frequency threshold and based on the ringing's duration not exceeding the empty wireless power transmitter duration threshold.

8. The wireless power transmitter of claim 5 wherein the controller is configured to:
   determine the resonant frequency and a decay rate of the ringing;
   based on the ringing's duration not exceeding the empty wireless power transmitter duration, determine whether the resonant frequency is between a wireless power receiver frequency threshold and a foreign object frequency threshold;
   determine that a wireless power receiver with no foreign object is present on or near the wireless power transmitter based on:
      a determination that the resonant frequency is between the wireless power receiver frequency and foreign object frequency thresholds; and
      a determination that the decay rate exceeds a decay rate threshold and the ringing's duration exceeds a ring duration threshold.

9. The wireless power transmitter of claim 8 wherein, based on a determination that the resonant frequency is between the wireless power receiver threshold frequency and the foreign object frequency threshold, the controller is configured to determine that a foreign object is present on or near the wireless power transmitter if either the decay rate does not exceed the decay rate threshold or the ringing's duration does not exceed the ring duration threshold.

10. The wireless power transmitter of claim 1 further comprising the power train and a surface on which wireless power receivers are to be placed to wirelessly receive power.

11. A wireless power transmitter, comprising:
   a power train comprising at least one transistor coupled to an LC tank circuit;
   an analog-to-digital converter (ADC) coupled to receive and convert an analog signal associated with the power train to digital values;
   a controller coupled to the tank circuit and being configured to cause pulses generated by the controller to be applied to the at least one transistor of the power train to thereby cause the LC tank circuit of the power train to ring at a resonant frequency, to receive digital values from the ADC acquired while the power train is ringing, the digital values indicative of the ringing, to compute a value indicative of a duration of the ringing, a decay rate of the ringing and a peak amplitude at a beginning of a ringing period, and to:
      determine that no wireless power receiver nor foreign object is present on or near the wireless power transmitter if the value indicative of the duration of the ringing is greater than an empty wireless power transmitter duration threshold;
      determine that a foreign object is present on or near the wireless power transmitter if the value indicative of the duration is less than the empty wireless power transmitter duration threshold, the decay rate is greater than a decay rate threshold, and the peak amplitude is greater than a peak amplitude threshold; and
      determine that a wireless power receiver is present on or near the wireless power transmitter with no foreign object if the value indicative of the duration is less than the empty wireless power transmitter duration threshold, and at least one of the decay rate is less than the decay rate threshold or the peak amplitude is less than the peak amplitude threshold.

12. The wireless power transmitter of claim 11 wherein the controller is configured to:
   determine the resonant frequency of the ringing; and
   calculate each of the peak amplitude and the decay rate thresholds based on the determined resonant frequency.

13. The wireless power transmitter of claim 11 wherein the controlled causes a reduction in a level of power to be wirelessly transferred upon determining a foreign object is present.

14. A method, comprising:
   pinging a wireless charging power train comprising at least one transistor and an LC tank circuit with a plurality of pulses to thereby cause the LC tank circuit of the power train to ring; and
   determining whether a wireless power receiver is present on or near a wireless power transmitter or whether a foreign object is present on the wireless power transmitter based on values computed from the power train ringing.

15. The method of claim 14 wherein determining whether a wireless power receiver is present on the wireless power transmitter or whether a foreign object is present on the wireless power transmitter comprises:
   determining a duration associated with the power train ringing;

determining that no wireless power receiver nor foreign object is present on or near the wireless power transmitter if the duration exceeds an empty pad duration threshold.

16. The method of claim 14 further comprising:
determining a peak amplitude of the ringing at a beginning of a ringing period;
determining a decay rate of the of the ringing; and
determining that a foreign object is present on or near the wireless power transmitter based on the peak amplitude exceeding the peak amplitude threshold and the decay rate exceeding the decay rate threshold.

17. The method of claim 16 further comprising determining that a wireless power receiver is present on near the wireless power transmitter based on:
either the peak amplitude not exceeding the peak amplitude threshold or the decay rate not exceeding the decay rate threshold; and
the ringing's duration not exceeding an empty pad duration threshold.

18. The method of claim 16 further comprising:
determining the resonant frequency of the ringing; and
calculating each of the peak amplitude and the decay rate thresholds based on the determined resonant frequency.

19. The method of claim 16 further comprising reducing an amount of power wirelessly transferred upon determining that a foreign object is present on a surface of the wireless power transmitter.

20. The method of claim 14 wherein pinging the power train includes providing a plurality of electrical pulses to the power train.

21. A wireless power transmitter, comprising:
a power train comprising at least one transistor coupled to an LC tank circuit;
an analog-to-digital converter (ADC) coupled to receive and convert an analog signal associated with the power train to digital values;
a pulse generator coupled to the tank circuit and being configured to:
cause pulses generated by the pulse generator to be applied to the at least one transistor of the power train to thereby cause the LC tank circuit of the power train to begin ringing;
receive digital values from the ADC acquired while the LC tank circuit of the power train is ringing and after the pulses are completed; and
based on an analysis of the digital values of the ringing of the power train, to determine whether a wireless power receiver is present on or near the wireless power transmitter or whether a foreign object is present on or near the wireless power transmitter.

22. A wireless power transmitter, comprising:
a power train comprising at least one transistor coupled to an LC tank circuit;
an analog-to-digital converter (ADC) coupled to receive and convert an analog signal associated with the power train to digital values;
a pulse generator coupled to the tank circuit and being configured to cause pulses generated by the pulse generator to be applied to the at least one transistor of the power train to thereby cause the LC tank circuit of the power train to ring at a resonant frequency, to receive digital values from the ADC acquired while the power train is ringing, the digital values indicative of the ringing, to compute a value indicative of a duration of the ringing, a decay rate of the ringing and a peak amplitude at a beginning of a ringing period, and to:
determine that no wireless power receiver nor foreign object is present on or near the wireless power transmitter if the value indicative of the duration of the ringing is greater than an empty wireless power transmitter duration threshold;
determine that a foreign object is present on or near the wireless power transmitter if the value indicative of the duration is less than the empty wireless power transmitter duration threshold, the decay rate is greater than a decay rate threshold, and the peak amplitude is greater than a peak amplitude threshold; and
determine that a wireless power receiver is present on or near the wireless power transmitter with no foreign object if the value indicative of the duration is less than the empty wireless power transmitter duration threshold, and at least one of the decay rate is less than the decay rate threshold or the peak amplitude is less than the peak amplitude threshold.

* * * * *